Patented Nov. 7, 1922.

1,434,600

UNITED STATES PATENT OFFICE.

GEORGE HOLT FRASER, OF BROOKLYN, NEW YORK.

SCREEN AND OTHER SEPARATOR.

Application filed July 29, 1914, Serial No. 853,940. Renewed August 23, 1922. Serial No. 583,935.

*To all whom it may concern:*

Be it known that I, GEORGE HOLT FRASER, a citizen of the United States, residing at No. 226 Quincy Street, in the borough of Brooklyn, county of Kings, city and State of New York, have invented certain new and useful Improvements in Screens and Other Separators, of which the following is a specification.

This invention relates to separators of the inclined screen type for separating fine from coarse material, and aims to provide certain improvements therein.

Heretofore separators of this type have been used with a continuous inclined spring-mounted screen onto the top of which material to be screened has been distributed by a conveyor, and the screen has been jarred to prevent clogging. For protecting the fine screen a coarse or guard screen has been provided above it. For varying the inclination of the screen the casing carrying it has been adjusted.

My present invention aims to provide an inclined screen in which ample area can be availed of without too great an acceleration of the speed of flow down the screen; also one in which the inclination of the screen can be varied without adjusting the casing; and also to provide improved scalping provisions for protecting the fine cloth from coarse material, improved jarring mechanism, and various improved features in construction.

To this end in carrying out the preferred form of my present improvements, I provide a plurality of successive screen surfaces disposed one after and below another, with an intermediate dam or dams for checking the downwardly flowing material, changing its direction and delivering it to the succeeding screen, an improved and relatively short guard screen above the fine screen, improved supporting means for the screens, and I mount the individual screens movably or adjustably, and provide means for collectively varying their inclination independently of the casing, and I provide jarring means acting on two adjacent screens, and means for equally poising the screens relative to the jarring mechanism, and I provide an improved striking or jarring mechanism, an improved feeder, and certain other features of improvement, all of which will be more fully hereinafter set forth with reference to the accompanying drawings, in which.

Referring to the drawings, let A indicate the main frame or casing, B the feeder or distributor, and C the screens, of a separator.

The casing may be any suitable supporting or enclosing member of the desired width and inclination, and may be either fixed or adjustable in its inclination.

The feeder may be any usual or suitable means for properly distributing the material to the screen, and the screen or screens may be any suitable inclined means for carrying the desired mesh of metal or other screen clothing, the parts being suitably disposed so that the material will be delivered through the inlet D on top of the screens and flow downwardly, the coarse discharging over the top of the screens through a coarse or tailings outlet E, and the fines passing through the screens and escaping through the fine outlet F. As shown, the main casing is fixed rigidly at any one of several positions of angularity to which it is adjustable, so that when thus fixed it is stationary, being carried by feet $a$ and legs $b$ to which it is separably bolted, so that the parts can be folded or collapsed for packing, and the legs have a plurality of holes to any of which the main casing may be bolted for determining its permanent working inclination.

As shown the screen or screens are movably, yieldingly or otherwise, so mounted in the casing that they can be jarred or vibrated to prevent clogging, an impactive jarring or vibrating mechanism G is shown in connection with them, these and the distributor being operated by the main reversible drive H.

As thus far described they may be of any usual or suitable construction for the purpose, those shown being improvements incident to my invention for which other substitutes may be used if desired.

Referring to the drawings I will now describe in detail the preferred embodiment of my improvements as illustrated therein.

Inclined screens when relatively extended downwardly a sufficient distance to effect the complete screening of a considerable quantity of material are inefficient at their lower portions by reason of the acceleration of its speed of flow as the material descends.

To obviate this my invention provides a succession of relatively short screen sections with intermediate interceptors or feeders whereby the down flowing material will be arrested, deflected, stopped, re-started and re-fed between successive screen sections.

This is preferably accomplished by forming the inclined screen of two or more subdivisions or sections superposed in different but preferably substantially parallel inclined planes and each so mounted or poised that it can be jarred, moved or vibrated independently of or in conjunction with another or adjacent section. As shown three screens C are mounted one above another in the casing A on springs $c$ which preferably hook under their upper sides and support and position them and by springs $d$ at their lower edges which yieldingly and slidably support them so that the screen frames may be expanded positively or elastically to stretch the screen cloth, but will be held yieldingly upwardly with considerable stress against upward stops or resting or positioning means. Preferably each screen has a feed plate $e$ fastened on its upper edge which passes under the upper bar or feeder $f$ at the top and intermediate bars or re-feeders $g$ below and by contacting with the underside thereof resists the upward stress of the springs $c$ and when the screen is depressed and rises strikes this bar with an upward impact which causes an upward jolt tending to jar and clean the cloth. The bars $g$ are supported from the sides of the main frame or casing, and preferably from the side plates M thereof, to move therewith, and are spaced above the bottom L to afford a passage for material beneath them, and are preferably spaced below the screen frame to afford room for its depression and resilient action above them, and have a flange or part beneath the screen clothing arising upwardly within the clearance afforded within the screen frame to prevent leakage backwardly under the screen. At its lower edge each screen preferably presses upwardly against an impact member or post $h$ which has a foot or portion engaging the top of the screen and acting as a stop to limit its upward movement and hold it down against the stress of its spring $d$ and is itself preferably carried by a cross member or dam I which engages a shoulder $i$ of the post and serves as an abutment for arresting upward movement of the post as well as a stop for positioning it. Each post is movably and detachably mounted, preferably by slidably or otherwise connecting it to the dam I, so that it can be pressed upwardly against the latter by the stress of the screen springs, but can move downwardly against these springs when the post is depressed or struck by the jarring mechanism to impart impactive blows to the screen to vibrate the latter. Thus each screen segment is held in poise between the stress of its supporting springs and the resistance of its stops or jarring members, so that it holds these in position to impart vibrating impulses to the cloth and is positioned by these to insure its proper relation thereto and to the interceptor I.

Figure 7:
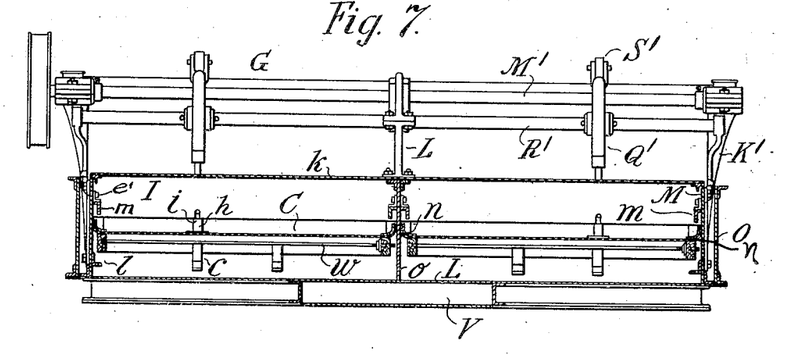
Fig. 7 is a fragmentary longitudinal section cut approximately on the line 7—7 of Fig. 1 and looking in the direction of the arrow.
Figure 8:
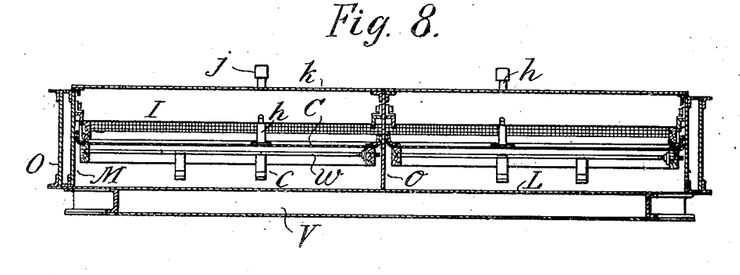
Fig. 8 is a longitudinal section cut approximately on the line 8—8 of Fig. 1 and looking in the direction of the arrow.

The dam is preferably an angle bar or plate having a slot or hole into which the head $j$ of the post is slidably fixed so that the post projects outside of the casing to be acted on by the jarring mechanism, but the post can be easily removed by depressing it against the tension of the springs until the reduced portion of its head will slide out of the slot and permit its forward removal, whereupon the lower edge of these adjacent screens can be swung upwardly and without through the top after the swinging cover $k$ has been tilted up or removed. Beneath each screen I prefer to place a track or angle $l$ on which the screen can be dropped to slide it into position, and above each screen I prefer to hinge on a pivotal bolt $e'$ (see Figs. 1 and 7) or movably or removably mount a top guard or bar $m$ (see Fig. 1) at each end of each screen which may extend the length of the screen or less and which bars cover the ends $n$ of the screen to prevent particles flowing between the ends and the adjacent side walls, but which can be removed or swung up when the screen is lifted to remove it. The end of each screen is preferably extended beyond its frame and bent upwardly against the side wall to utilize the elasticity of the flexible screen clothing to make a joint between the screen and the side walls, and this up-turned end may pass within the guard as shown, and where the stiffness of the screen clothing is not sufficient it may be covered with a strip of suitable material as shown. To avoid inconvenient length of screen frame I prefer to make the frame in two or more longitudinal sections and provide an intermediate wall $o$ between them similar to their side walls M, the number of these sections depending on the total length of the screen surface desired.

For tightening the screen cloth I prefer to use transverse expansion rods preferably elastically and adjustably expanding the screen frames and extending through the latter so that the end of the rod is accessible outside of and below the screen for screwing the rod in or out to increase the elastic pressure or vary the expansive action to adjust the cloth tension as desired. I have shown a screw threaded rod $p$ passing through a nut $q$ and seated in the socket $r$ in the top side of the frame. The nut $q$ is shown as frictionally engaging the screen frame to resist rotation. Beneath the cloth the rod $p$ is surrounded by a compression spring $s$ which presses against the screen frame more or less as the rod is screwed through the nut $q$ on the opposite frame, the end of the rod passing through a hole $u$ in the frame and projecting into the space between the dam and screens and having a wrench provision $v$ by which it can be turned to adjust it. In this way the screen can be adjusted without removal.

The longitudinal adjustment of the screens is preferably positive, and is made by a similar bar $w$ crossing the rods $p$ and similarly constructed except that for positive adjustment the spring $s$ is omitted the end of the bar $w$ being accessible beneath the upturned edge of the screen as shown.

In the multi-step arrangement shown the material entering the inlet D will flow over the top bar or feeder $f$ onto the feed plate $e$ of the top screen and flow down the latter with accelerating speed. The width of the screen section will be limited relatively to its inclination so that before the speed of flow exceeds the screening point the lower side of the screen will be reached. The material will then jump from the lower edge of the screen across the reversed or downward passage J and hit against the dam I which will intercept it and deflect it downwardly through the passage J and onto the re-feeder $g$ which will intercept it or deflect it forwardly through the re-feeding passage K onto the feed plate of the next screen section, across which it will travel as before, and at the lower side of which it will be again intercepted, arrested and deflected and re-fed as described. At the lowermost section the coarse material remaining on the screen cloth will be deflected into the outlet E.

The fine material passing through the screen will fall onto the inclined bottom L, which is preferably of steeper inclination than the screen clothing, and will slide down this bottom and escape through the fine outlet F.

I prefer to fix rigidly the main casing in the predetermined position of adjustment which the holes in the legs $b$ provide for and permanently set it, and provide for adjusting the inclination of the screens relatively to it. As shown this is accomplished by fixing the dams and deflectors and internal parts to side plates M which are hinged at N to the wider sides O of the main casing on which sides the bottom or door L is fixed or hinged so the swinging screen carrier can be adjusted slightly up or down and thus simultaneously adjust the inclination of all the screen sections and parts collectively as a group.

In such case the jar mechanism and cover are preferably mounted on the swinging carrier, either on the edges of the side plates M thereof or on the cross bars or on both as shown.

Where fine screening of material containing large pieces is necessary it is desirable to protect the fine cloth by a scalper screen which will prevent the large pieces from falling onto the fine cloth and take them away from it.

My invention provides means whereby such a scalper screen can be separably and removably interposed between the distributor and the fine screen in such manner that it can be easily inserted or removed, and it provides for such a scalping screen without interfering with either access to or removal of the fine screen, and it provides an improved feeder for distributing and improved means for removing or taking away the oversize extracted by the scalping screen when used.

Figure 4:
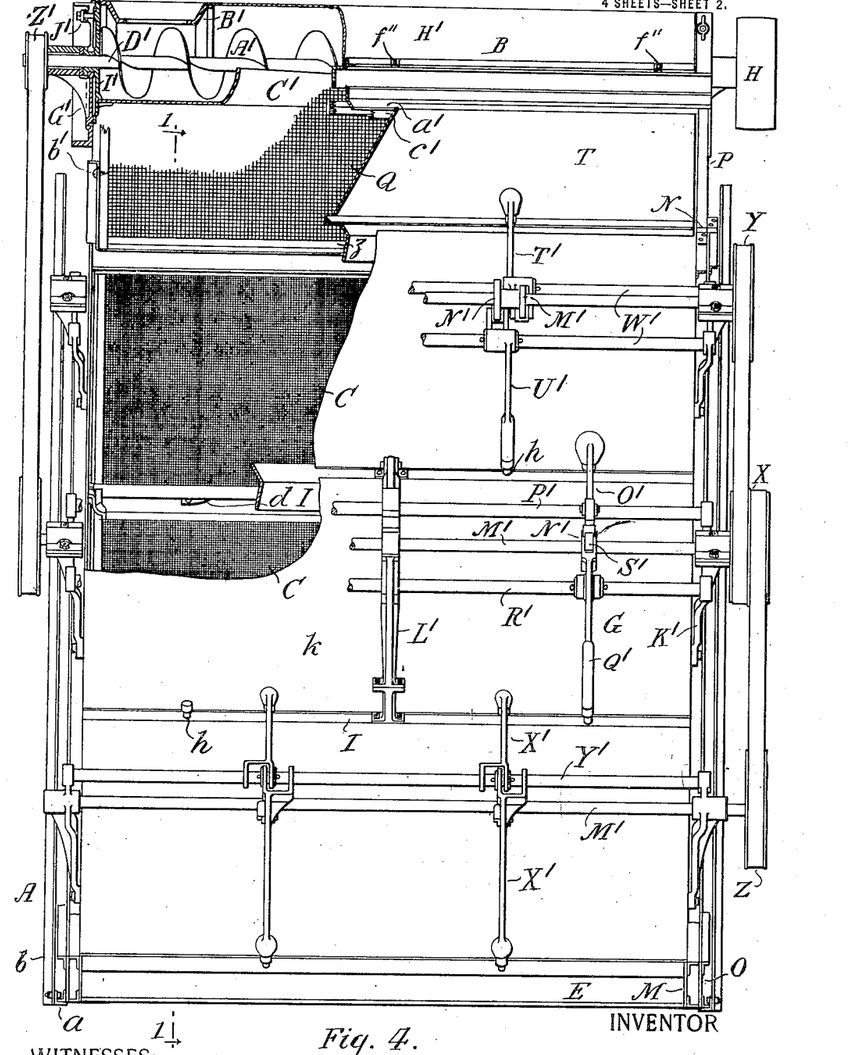
Fig. 4 is a front elevation thereof, partly broken out to show the internal parts and partly in section approximately on the line 4—4 of Fig. 1 and looking in the direction of the arrow.
Figure 5:
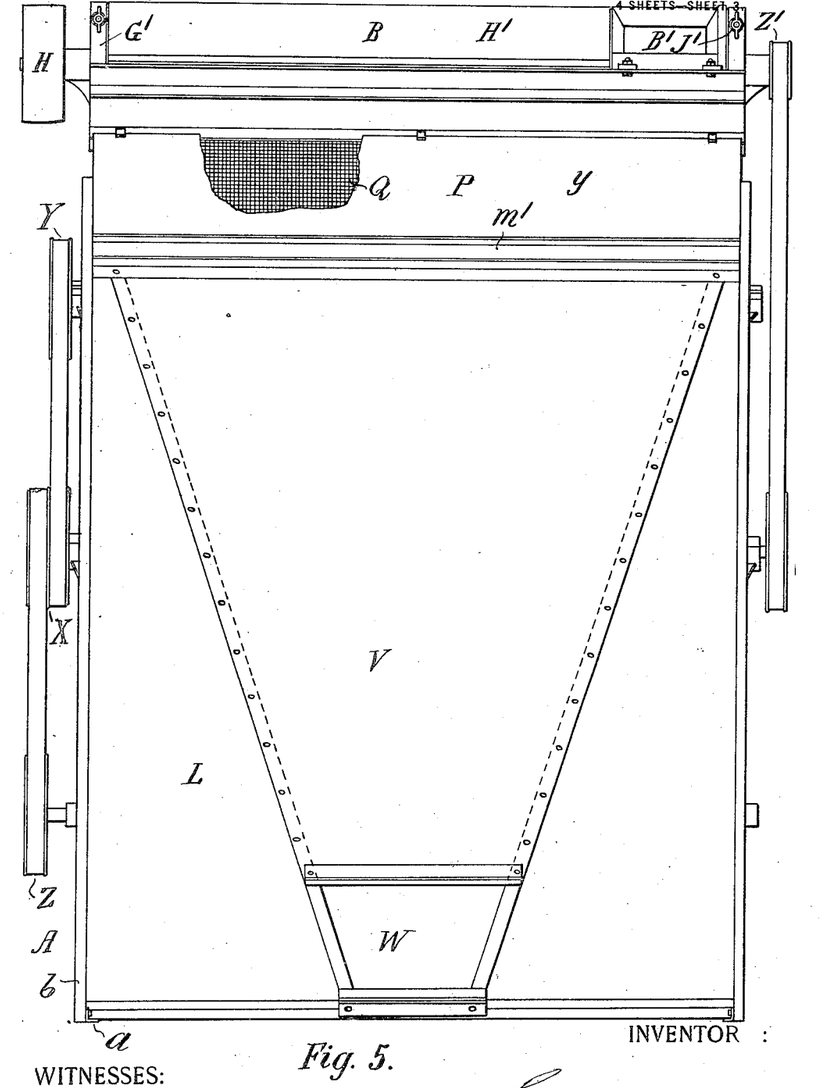
Fig. 5 is a rear elevation thereof partly broken away.
Figure 6:
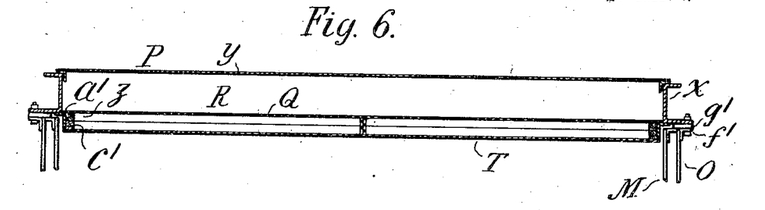
Fig. 6 is a fragmentary longitudinal section of the scalper cut approximately on the line 6—6 of Fig. 1.

Preferably the feeder B is a removable reversible distributor adapted to be separately fastened directly to the main casing A and be turned with its drive pulley at either side as shown in Fig. 4 or to be spaced apart from and carried thereby through an intermediate auxiliary tubular member P preferably inclined reversely of the main casing and comprising a coarse or scalping screen Q beneath the distributor, and a coarse tailings chute R below this screen, and fine tailings spout S beneath it, and a front feed bar or cover T for directing the material passing through the scalping screen downwardly and rearwardly onto the top feed bar $f$ for delivering to the fine screens. The hopper P as shown consists of two channel bars $x$ bolted on the upper end of the casing, and carrying on their rear side a back door or cover $y$, on their front side the screen Q and cover T and on their upper ends the distributor B, the parts being so arranged that material distributed over either the front or rear edge of the latter will fall onto the upper part of the scalping screen so that the fine material will pass through it to the fine screens and the coarse material will flow down it to the scalping outlet U above and back of the fine screens and outside of the fine chamber between them and the back door L, from whence they may be directed wherever desired, but are preferably conducted downwardly and forwardly beneath the door L by a scalping chute V separably and reversibly connected to the parts and extending downwardly under the back door L and opening at W near the bottom of the latter. The scalping chute V is of the width of the scalping screen at the top and converges toward the center at the bottom or is contracted toward the direction in which it is desired the scalpings should be delivered.

The cover T is removable to give access to the screen Q, and the latter is removable for cleaning, repair or renewal. These parts slide into position above the main casing and are clamped against the distributor and extension R. The screen Q is preferably nailed to a wooden frame $z$ clamped in the angle frame $a'$ and stretched thereon by screws $b'$ for keeping it taut, and the cover T is preferably separable from these parts and similarly carried thereon by being fastened to a similar wooden frame $c'$ fitting in the angle iron frame so that this cover can be swung down or removed.

Although it is immaterial whether the scalping screen inclines forwardly in the same direction as the fine screens are rearwardly reversely thereof, according to whether the scalpings should be removed above or below the separator, it is preferable for compactness and accessibility that the reverse arrangement shown be employed as it brings the distributor forward and avoids unnecessary height while directing the scalpings backward and beneath the separator so that the scalping chute does not obstruct the front and may be run down close to the back door or reversed according to whether the scalpings are to be delivered forwardly, rearwardly or vertically to suit particular conditions of use.

The improved distributor comprises a distributing screw conveyor A' preferably revoluble in either direction, a removable or reversible hopper B' which can be removed and turned around and be placed at either end, and a trough C' through which the conveyor pushes the material and over either the forward or rearward edge of which it discharges the same in a wide thin stream. These edges are preferably reversely inclined and adjustable around the axis of the driving shaft D' and adjustable in their inclination to give the desired distribution of material. The front and rear vertical walls E' are spaced apart from the trough to leave passages through which material can descend, and the bottom walls are inclined and converge toward each other and consist of the scalping screen at one side and the feed plate or bar F' at the other side so that material will be directed under the conveyor and will fall onto the scalping screen when fed from either side of the distributor.

Figures 1, 2, 3:
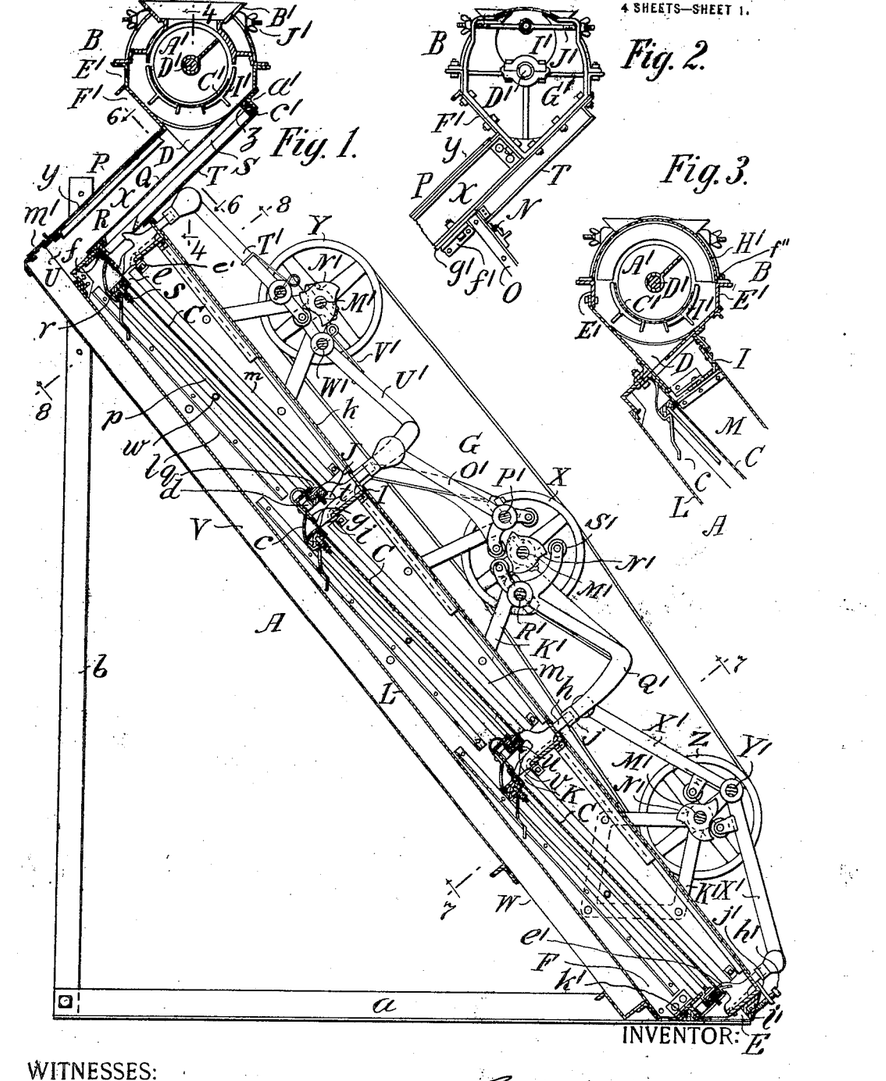
Fig. 1 is a vertical transverse section of an inclined screen separator embodying the preferred form of my present invention, the view being cut approximately on the line 1—1 of Fig. 4 and looking in the direction of the arrow.
Fig. 2 is a fragmentary side elevation thereof.
Fig. 3 is a similar view with the scalper section omitted and the distributor directly on the body.

Preferably the distributor comprises two identical head castings G' having a top opening or slot through which the conveyor parts can be lifted, and carrying the bearings for the driving shaft, these heads being connected by the front and rear bars E' and having flanges by which they are bolted to the main casing or the auxiliary channels $x$. Each head has an internal semi-circular flange against which the cover H' closes, and on the inner side of which head is mounted an adjustable trough carrier I', which can be oscillated around the axis of the trough to distort the trough to adjust the inclination of its edges or to turn it bodily to raise either edge. Adjusting screws J' carried by the head and connected to the carrier (as shown in Figs. 2 and 4) serve to adjust and hold the latter. The carriers have a flanged boss fitting the bore in the head and holding the carrier against the head so that it can oscillate in this bore but will close the slot in the head to prevent egress of dust. They have flanges on which the trough is mounted to support it and notches engaged by fingers on the trough which cause the trough to twist when the carriers are adjusted. The cover H' is hinged as shown in Fig. 4, or mounted so that it can be opened to expose the conveyor for adjustment or observation by the hinges $f''$ as shown in Figs. 3 and 4. The cover extends from one head to the hopper and rests on the flange of the latter, and the body of the hopper constitutes the intermediate portion of the casing or closure of the distributor between the cover and the other head.

By this arrangement the distributor can be driven in either direction from either end and fed at either end. Its cover can be turned up from front or rear or lifted off. The trough can be adjusted to give the desired distribution, and it with the conveyor and carriers can be lifted out through the head slots without removing the heads. All adjustments of the trough can be made from the outside and results observed through the scalper door *y* or front cover T without opening the distributor.

The jarring mechanism may be located where desired and be of any suitable character, but according to the preferred form of my invention I place it above and outside of the main casing, preferably mounting it on and to move with the adjustable or swinging screen carrier M so that it will follow the movements of the latter and thus preserve its relation to the screens themselves. This is preferably accomplished by carrying it on brackets K' bolted to the outside of the sides M and between these and the stationary sides O of the casing and bearing on the top flanges of the former, and by intermediate brackets L' bolted on the dam bars I, these being elevated to permit up-swing of the individual screen covers *k* for observation of the screens or up-swing of the screens for their removal beneath the brackets.

Where a plurality of screens is employed my invention provides for simultaneously jarring two adjacent screens with the one mechanism, and where three screen sections are employed it provides jarring mechanism which serves to vibrate each of the three sections. This is preferably accomplished by a revolving shaft M' carrying cams N' oscillating swinging hammers O' mounted on the shaft P' and swinging hammers Q' pivoted on a shaft R' so that these hammers are alternately lifted and released so that they may fall by gravity and strike percussively on the heads *j* of the impact posts or strikers *h* to cause these to jar the adjacent portion of the two screens which each engages. The hammers O' are pivoted as high as practicable and the hammers Q' are pivoted as low as practicable so as to facilitate a gravity fall, but preferably to insure a quick fall and a strong percussive blow each is provided with a reverse wheel or part S' which is out of the path of the cam when the hammer is down, but stands in this path and may be hit by the cam if the hammer has not descended, in which case it will impel the hammer forcibly downward when struck by the cam. This insures a quick positive action without using springs, and is desirable for the jarring mechanism opposite the center one of three screens or when the mechanism is the sole reliance for jarring each of the three screen sections.

I prefer, however, to additionally and elastically jar the uppermost section of the screens because of the greater work imposed on it by reason of its initial position, and my invention provides a spring-impelled jarring device especially applicable to this section which preferably comprises hammers T' and U' lifted by a second cam M' and impelled downwardly by a spring V' which is normally passive but serves to resist excessive up-jump of the hammers when lifted by the cam and to impel them downwardly when released, as well as to position them on their pivotal shafts W' which may be disposed below the cam as the springs eliminate any question of gravity action. The hammer T' works close to the cover T and may be turned over against its cam shaft to facilitate opening the cover. The hammer U' is longitudinally extended to give room beneath it for raising the adjoining cover *k* or removing the screen.

The lowermost section of three screens may be moderately jarred, and my invention provides for this gravity hammers X' hinged to a shaft Y' above their cam M' so that their swing and fall will be moderate and the corresponding screen section will be but slightly jarred thereby.

The central or intermediate jarring mechanism is preferably driven from the pulley Z' on the driving shaft, and each auxiliary mechanism if used is preferably driven from the central jarring mechanism, as shown by double pulley X and upper and lower pulleys Y and Z respectively.

In operation if the material is coarse enough to require scalping the scalping screen will be mounted on the main casing and the distributor mounted on the scalping screen, each disposed to suit the position of feed and direction of drive. Feed entering the hopper will be distributed in a wide thin stream over the scalper which will extract the large pieces and send them around the separator while permitting the medium material to pass through the conduit S to the top bar or feeder *f* and over onto the uppermost screen, down which it will flow to the first dam I which will arrest and reverse it directing it to the feed plate for the second screen and so on. If the screens are depressed as they rise they will be suddenly arrested by the cross bars and stops, thus giving them an upward jolt which will lift large pieces out of the meshes. If they are vibrated by the jarring mechanism the impactive impulses resulting will cause the screens to free themselves of clogging material and tend to preserve their efficiency. The screen stretching mechanism will keep the screen clothing taut and its adjustment will provide for stretching. The operation may be observed by lifting or removing any door, and the door or screen below it may be removed by lifting the hammers without removing the latter.

Undue acceleration of flow down the fine screens will be prevented, so that the full efficiency of each can be utilized in screening to avoid an undue percentage of fines remaining in the coarse tailings, and the screens and dams can be extended as desired to suit the quantity or character of the work.

The initial fixing of the main frame by a predetermined inclination definitely locates the hopper, and the adjustability of the fine screens when the movable carrier is used therefor permits any slight adjustment desirable to suit the screen to variations in material or fineness within the ranges provided for.

The greater steepness of the bottom or back door L compared to the inclination of the screens themselves will facilitate outflow of the fine material, and the hinging or removable connection of this back door will make access beneath the screens easy if this becomes necessary.

The poising of each screen on its supporting springs, and the supporting and positioning of each screen in suspension by springs will make each particularly sensitive to vibratory action, able to assume a position adapted to the other parts and adjust itself to conditions, and the unobstructed space above each screen free from any internal overhang at the side walls will permit ready removal or insertion of any screen. The projecting free ends of the screens will make suitable movable contact with the side walls to prevent leakage between the ends of the screen frames and the side walls. The feed plates screwed on the top of the screen frames will prevent leakage above these, and their angles will stiffen the frames to distribute the expansive thrust of the stretching rods $p$.

It will be seen that my invention provides improvements which can be readily and advantageously availed of in whole or in part, and it will be understood that the invention is not limited to the particular details of construction, arrangement or combination of parts set forth, as constituting its preferred embodiment, since it can be employed in whole or in part according to such modifications, adaptations or combinations as circumstances or the judgment of those skilled in the art may dictate without departing from the spirit of the invention.

The springs for the upper edge of an intermediate screen section are preferably extended upwardly under the lower edge of the next preceding section and movably mounted so that they can oscillate to equalize their stress against each section and to transmit the movement and vibrations of one screen to another, as well as to permit each to assume its proper position or vary its inclination relatively to the other or the abutments, stops or impact members. The latter when acting against two adjacent sections distribute the shock to each, and transmit vibration from one to another, in addition to positioning the parts and holding them in place.

Spring catches or stops $e'$ for holding screens downwardly and supporting them when unhooked are employed, as shown at the lower edge of the lowermost screen in Fig. 1.

The head angles $f'$ of the side walls O are preferably provided with a spacer $g'$ so as to form a chamber or pocket between this wall and the top section into which the scalping screen or its frame may pass.

When the double side walls are used so that the outer one constituting the main casing is stationary or fixed at the bottom and the auxiliary walls constituting the adjustable walls carrying the screen are hinged at the top to the other walls these parts are telescopic and the main casing holds the hopper stationary irrespective of the individual screen adjustment or the adjustment of the screens as a group, the several outlets being stationary relatively to the main frame as the lower end of the auxiliary frame moves within it and adjustment of the casing and the screens as a group is preferably effected by one or more screws $h'$ engaging the lower part or the cross angle $i'$ of the fixed casing and the lower dam bar or angle $j'$ of the swinging casing. The coarse outlet is between the bar $i'$ and the bar $k'$ of the main casing, and the fine outlet is between the lower edge of the bottom door or back cover L and the bar $k'$.

The door $m'$ gives access to the scalping chute, and the side bars of the latter constitute diagonal braces for holding the frame against distortion.

What I claim is:

1. In combination, an inclined resiliently mounted removable screen, springs below and acting upwardly against the lower horizontally extending edge of and sustaining said screen resiliently transversely of its direction of inclination and movably in its direction of inclination at points intermediate of its sides, and jarring mechanism acting downwardly against the lower horizontally extending edge of said screen intermediate of its sides for jarring it.

2. In combination, an inclined resiliently mounted removable screen, springs below and acting upwardly against the upper horizontally extending edge of said screen at points intermediate of its sides and sustaining said screen resiliently transversely of its direction of inclination and movably in its direction of inclination, and jarring mechanism acting downwardly against the upper horizontally extending edge of said screen at points intermediate of its sides for jarring it.

3. In combination, an inclined resiliently mounted removable screen, springs below and acting upwardly against the upper and lower horizontally extending edges of said screen at points intermediate of its sides and sustaining said screen resiliently transversely of its direction of inclination and movably in its direction of inclination, and jarring means acting downwardly against the upper and lower horizontally extending edges of said screen at points intermediate of its sides for jarring it.

4. In combination, a casing having bottom and side walls affording an inclined screening chamber and an inclined removable top portion affording a closure for said chamber, and comprising a portion depending within said chamber, and an inclined screen mounted on and movable with said depending portion within said chamber and removable from said chamber with said removable top portion.

5. In combination, a casing having bottom and side walls affording an inclined screening chamber and a hinged top portion affording a closure for said chamber, and an inclined screen within said casing depending from and carried by and movable with said hinged top portion.

6. In combination, a casing having bottom and side walls affording an inclined screening chamber and comprising an inclined swinging top portion affording a closure for said chamber, a resilient removable inclined screen depending within said chamber from said swinging top portion, and means for jarring said screen mounted on said swinging top portion.

7. In combination, two spaced screens, means for removably supporting the screens in inclined substantially parallel planes one above the other and movable independently of each other, and means disposed intermediate the screens in the general plane thereof and independent of the relative movement thereof for supporting the lower edge of the upper screen and receiving material passing over the upper screen and diverting it onto the lower screen.

8. In combination, two spaced screens, means for resiliently and removably supporting the screens in inclined substantially parallel planes one above the other and movable independently of each other, and means disposed intermediate the screens in the general plane thereof and independent of the relative movement thereof for receiving material passing over the upper screen and diverting it upon the lower screen and for forming an abutment for the upper edge of the lower screen to limit the upward motion thereof.

9. In combination, an inclined screen, a casing therefor comprising side members and constituting a screening chamber, means within the chamber for jarring the screens and means intermediate the side member for removably supporting the said screen, and jarring means and including means for varying the inclination of the screen.

10. In combination, a movable and removable inclined screen comprising a horizontally expansible frame and a screen clothing mounted thereon and having an upwardly bending free yielding edge projecting over the edge of said frame, a casing for said parts comprising a side wall spaced apart from said frame and yieldingly and slidingly engaged by the projecting edge of said clothing for preventing leakage between said parts, and means for horizontally expanding said frame to vary the tension of said clothing and press said edge against said wall.

11. In combination, a movable and removable inclined screen comprising a horizontally expansible frame having an upwardly bending yielding member projecting over the side edge of said frame, a screen clothing mounted on said frame, a casing for said parts comprising a side wall spaced apart from said frame and yieldingly and slidingly engaged by said projecting member for preventing leakage between said parts, and means for horizontally expanding said frame to vary the tension of said clothing and press said member against said wall.

12. In combination, two removable relatively resilient inclined screens, one below and in a lower plane than and successive to the other, similarly inclined fixed means below the lower edge of said upper screen and above the upper edge of said lower screen affording a shelf for receiving material discharged from said upper screen and diverting it on to said lower screen.

13. In combination, an upper inclined screen, a similarly inclined feed plate below the lower edge of said screen for receiving and diverting material therefrom having a downwardly projecting lower edge affording a recess beneath said plate, and a lower removable inclined screen below and successive to said plate and removably mounted with its upper edge beneath the latter and opposite said recess for receiving material diverted by said plate.

14. In combination, a casing affording a screening chamber provided with a part comprising an inclined top affording an opening the width of said chamber and cross members above and below said opening, a removable cover for said chamber closing said opening, a removable inclined screen movably mounted in said casing opposite said opening, a plate above similarly inclined to and independent of, said screen for diverting material thereto affording a recess into which the upper edge of said screen may be moved for permitting its lower edge to be moved upwardly through said opening, means above said screen for jarring it, and revolving means for operating said jarring means.

15. In combination, a casing affording a screening chamber, comprising an inclined bottom wall, an inclined screen mounted in said chamber, means affording a similarly inclined shelf above said screen, a screen above said screen for keeping coarse material therefrom and delivering screened material thereto, a plate beneath said upper screen receiving material from said upper screen and diverting it on to said shelf, and means affording a chute for receiving coarse material passing over said second screen and conducting it without said chamber beneath the inclined wall of the latter, said bottom wall of said chamber affording a top wall for said chute.

16. In combination, an inclined screen comprising a screen clothing and an expansible frame on which it is mounted having a seat on one side and a hole through its other side, an expansion member carried by said frame for stretching said clothing, having one end engaging said seat and its other end extending through said hole and accessible from the outer side thereof, and there having a wrench provision, and a screw-thread carried by said frame and engaging said member.

17. In combination, an inclined screen, jarring mechanism therefor, an adjustable frame or casing carrying said parts, and a main casing adjustably carrying said adjustable frame or casing and having side walls enclosing said screen and affording a closed screening chamber for said screen.

18. In combination, an inclined screen, and a casing therefor affording a screening chamber comprising two complementary members, one having an inclined bottom wall for said chamber beneath said screen, and the other adjustably connected to said first member, carrying said screen, and having side walls telescopically engaging said first member and for closing the side walls of said chamber.

19. In combination, an inclined screen, and a casing affording a screening chamber therefor comprising two members, one having an inclined bottom wall for said chamber beneath said screen, the other swingingly connected to said first member and carrying said screen, means affording an inclined top for said chamber and means affording collapsible side walls closing the sides of said chamber.

20. In combination, a plurality of similarly inclined resiliently mounted removable screens, one disposed below and in a lower plane than and successive to another, a plate inclined similarly to said screens below an upper one of said screens and above the next lower one of said screens affording a shelf for receiving material discharged over said upper screen and diverting it on to said lower screen, impact members for jarring said screens above and below said plate, and percussive means acting on said impact members.

21. In combination, an inclined screen, a frame or casing carrying said screen, springs pressing said screen upwardly, stops above said screen for vertically positioning it, and a hinged member carrying said stops and mounted to swing upwardly from said casing.

22. In combination, an inclined screen, springs pressing it upwardly, a casing, impact members above said screen positioning it vertically and resisting the stress of said springs, and a hinged member carrying said impact members and mounted to swing upwardly from said casing.

23. In combination, two or more relatively movable inclined screens disposed in succession and yielding means movably supporting two adjacent of said screens at their edges for transmitting the motion of stress of one to another.

24. In combination, a casing affording a screening chamber and consisting of a plurality of sections detachably secured together and communicating with each other, a resilient inclined screen mounted in a lower one of said sections, an inclined screen mounted in and detachable with an upper one of said sections for feeding screened material to said resilient screen and keeping coarse material therefrom, a plate above and similarly inclined to said resilient screen affording a shelf communicating between said screens for receiving material from said upper screen and diverting it on to said resilient screen, means for jarring said resilient screen, and means mounted on and detachable with said lower section affording a chute for coarse material passing over said upper screen.

25. In combination, a casing affording a screening chamber and consisting of a plurality of sections detachably secured together and communicating with each other, a lower one of said sections having downwardly inclined top and bottom walls, a resilient inclined screen mounted in and detachable with said lower section, the next upper one of said sections having top and bottom walls inclined reversely to those of said lower bottom, a screen inclined reversely to said resilient screen and mounted in and detachable with said upper section for feeding material to said resilient screen, a plate having a shelf above said resilient screen communicating between said screens for receiving material from said reverse screen and diverting it on to said resilient screen, and means for jarring said resilient screen.

26. In combination, a casing affording a downwardly inclined screening chamber, two resilient removable inclined screens mounted in said casing, one below and successive to and disposed in a lower plane than the other, and a bar or member intermediate of the adjacent edges of said screens and below and sustaining the lower edge of the upper one and above and positioning the upper edge of the lower one thereof.

27. In combination, a plurality of resilient inclined screens arranged in succession, a frame or casing therefor, and means for jarring said screens comprising impact members disposed above and acting percussively downwardly toward the latter, and overlapping two adjacent edges thereof.

28. In combination, two successive inclined resilient screens, a frame or casing therefor, and means for jarring said screens comprising a percussive post or member above and overlapping adjacent edges of two of said screens and limiting their upward movement, means limiting upward movement of said post or member, and means actuating said post or member.

29. In combination, a frame or casing affording a screening chamber and comprising side walls, a closed bottom wall and an open top, an inclined screen mounted in said screening chamber, springs mounted on said casing and exerting an upward stress against said screen, a movable and removable post or abutment mounted on said casing engaging said screen and resisting an upward stress of said spring, jarring mechanism, a movable or removable frame on which said post is mounted, and means for impactively jarring said post.

In witness whereof, I have hereunto signed my name in the presence of two subscribing witnesses.

GEORGE HOLT FRASER.

Witnesses:
GUSTAV SCHONHEIR,
JOSEPH E. HYLIND.